US012586258B2

(12) United States Patent
Mangla et al.

(10) Patent No.: US 12,586,258 B2
(45) Date of Patent: Mar. 24, 2026

(54) NON-ADVERSARIAL IMAGE GENERATION USING TRANSFER LEARNING

(71) Applicant: Adobe Inc., San Jose, CA (US)

(72) Inventors: Puneet Mangla, Faridabad (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 474 days.

(21) Appl. No.: 18/097,856

(22) Filed: Jan. 17, 2023

(65) Prior Publication Data

US 2024/0242394 A1     Jul. 18, 2024

(51) Int. Cl.
| | |
|---|---|
| *G06T 11/00* | (2006.01) |
| *G06V 10/764* | (2022.01) |
| *G06V 10/774* | (2022.01) |
| *G06V 10/776* | (2022.01) |
| *G06V 10/82* | (2022.01) |

(52) U.S. Cl.
CPC ............ *G06T 11/00* (2013.01); *G06V 10/764* (2022.01); *G06V 10/774* (2022.01); *G06V 10/776* (2022.01); *G06V 10/82* (2022.01)

(58) Field of Classification Search
CPC .................. G06T 11/00; G06T 11/001; G06T 2207/20081; G06T 9/002; G06V 10/82; G06V 10/776; G06V 10/774; G06V 10/764; G06N 3/0475; G06N 3/096
USPC ........................................................ 382/155
See application file for complete search history.

(56) References Cited

U.S. PATENT DOCUMENTS

2022/0122221 A1* 4/2022 Smith .................... G06V 10/28

OTHER PUBLICATIONS

Li, K. and Malik, J., 2018. Implicit maximum likelihood estimation. arXiv preprint arXiv:1809.09087. (Year: 2018).*
Wang, Y., Wu, C., Herranz, L., Van de Weijer, J., Gonzalez-Garcia, A. and Raducanu, B., 2018. Transferring gans: generating images from limited data. In Proceedings of the European conference on computer vision (ECCV) (pp. 218-234). (Year: 2018).*
Noguchi, A. and Harada, T., 2019. Image generation from small datasets via batch statistics adaptation. In Proceedings of the IEEE/CVF international conference on computer vision (pp. 2750-2758). (Year: 2019).*
Wang, Y., Gonzalez-Garcia, A., Berga, D., Herranz, L., Khan, F.S. and Weijer, J.V.D., 2020. Minegan: effective knowledge transfer from gans to target domains with few images. In Proceedings of the IEEE/CVF conference on computer vision and pattern recognition (pp. 9332-9341). (Year: 2020).*

(Continued)

*Primary Examiner* — Chineyere Wills-Burns
*Assistant Examiner* — Emmanuel Silva-Avina
(74) *Attorney, Agent, or Firm* — FIG. 1 Patents

(57) ABSTRACT

In implementations of systems for non-adversarial image generation using transfer learning, a computing device implements a generation system to receive input data describing random noise. The generation system generates a latent representation in a latent space of a machine learning model based on the random noise using a transformer model that is trained to generate latent representations in the latent space. A digital image is generated using the machine learning model based on the latent representation that depicts an object that is visually similar to objects depicted in digital images of a training dataset used to train the machine learning model based on a perceptual loss.

20 Claims, 11 Drawing Sheets

300 —

— 116

(56) References Cited

OTHER PUBLICATIONS

Ojha, U., Li, Y., Lu, J., Efros, A.A., Lee, Y.J., Shechtman, E. and Zhang, R., 2021. Few-shot image generation via cross-domain correspondence. In Proceedings of the IEEE/CVF conference on computer vision and pattern recognition (pp. 10743-10752). (Year: 2021).*

Karras, Tero , et al., "Training Generative Adversarial Networks with Limited Data", Cornell University arXiv, arXiv.org [retrieved Oct. 3, 2022]. Retrieved from the Internet <https://arxiv.org/pdf/2006.06676.pdf>., Oct. 7, 2020, 37 Pages.

Li, Yijun , et al., "Few-shot Image Generation with Elastic Weight Consolidation", Cornell University arXiv, arXiv.org [retrieved Oct. 3, 2022]. Retrieved from the Internet <https://arxiv.org/pdf/2012.02780.pdf>., Dec. 4, 2020, 12 Pages.

Mo, Sangwoo , et al., "Freeze the Discriminator: a Simple Baseline for Fine-Tuning GANs", Cornell University arXiv, arXiv.org [retrieved Oct. 3, 2022]. Retrieved from the Internet <https://arxiv.org/pdf/2002.10964.pdf>., Feb. 28, 202, 13 Pages.

Noguchi, Atsuhiro , et al., "Image Generation From Small Datasets via Batch Statistics Adaptation", Cornell University arXiv, arXiv.org [retrieved Oct. 3, 2022]. Retrieved from the Internet <https://arxiv.org/pdf/1904.01774.pdf>., Oct. 23, 2019, 12 Pages.

Ojha, Utkarsh , et al., "Few-shot Image Generation via Cross-domain Correspondence", Cornell University arXiv, arXiv.org [retrieved Oct. 3, 2022]. Retrieved from the Internet <http://128.84.4.34/pdf/2104.06820>., Apr. 13, 2021, 15 Pages.

Wang, Yaxing , et al., "MineGAN: effective knowledge transfer from GANs to target domains with few images", Cornell University arXiv, arXiv.org [retrieved Oct. 3, 2022]. Retrieved from the Internet <https://arxiv.org/pdf/1912.05270.pdf>., Apr. 2, 2020, 19 Pages.

Wang, Yaxing , et al., "Transferring GANs: generating images from limited data", Cornell University arXiv, arXiv.org [retrieved Oct. 3, 2022]. Retrieved from the Internet <https://arxiv.org/pdf/1805.01677.pdf>., Oct. 2, 2018, 22 Pages.

Zhao, Shengyu , et al., "Differentiable Augmentation for Data-Efficient GAN Training", Cornell University arXiv, arXiv.org [retrieved Oct. 3, 2022]. Retrieved from the Internet <https://arxiv.org/pdf/2006.10738.pdf>., Dec. 7, 2020, 23 Pages.

* cited by examiner

200

300
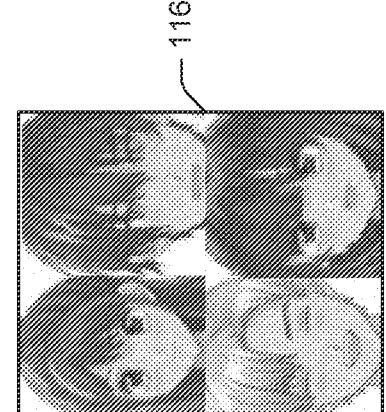
116
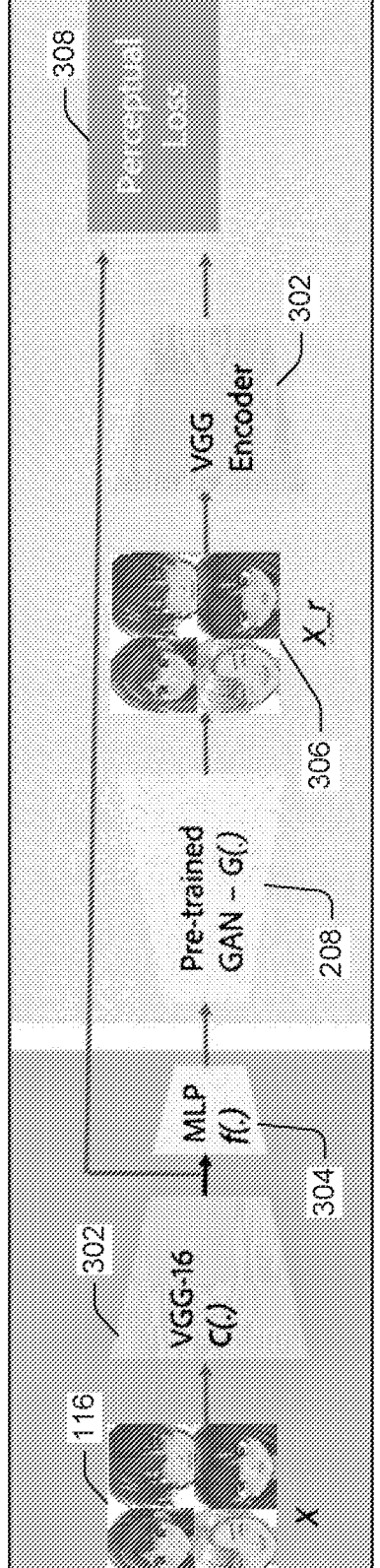
*Fig. 3*

Transformer Module
210

T(e) 402

Latent space: Z

406

404

Noise space: E

400

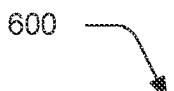

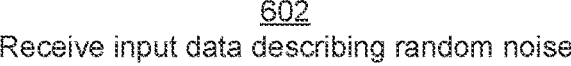

602
Receive input data describing random noise

604
Generate a latent representation in a latent space of a machine learning model based on the random noise using a transformer model that is trained to generate latent representations in the latent space

606
Generate a digital image using the machine learning model based on the latent representation, the digital image depicting an object that is visually similar to objects depicted in digital images of a training dataset used to train the machine learning model based on a perceptual loss

*Fig. 6*

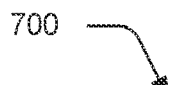

700

702
Receive training data describing a set of digital images

704
Train a machine learning model using the training data based on a perceptual loss 706
Train a transformer model using latent representations of digital images included in the set of digital images 708
Generate a digital image depicting an object that is visually similar to objects depicted in the digital images included in the set of digital images using the transformer model and the machine learning model based on random noise

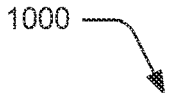
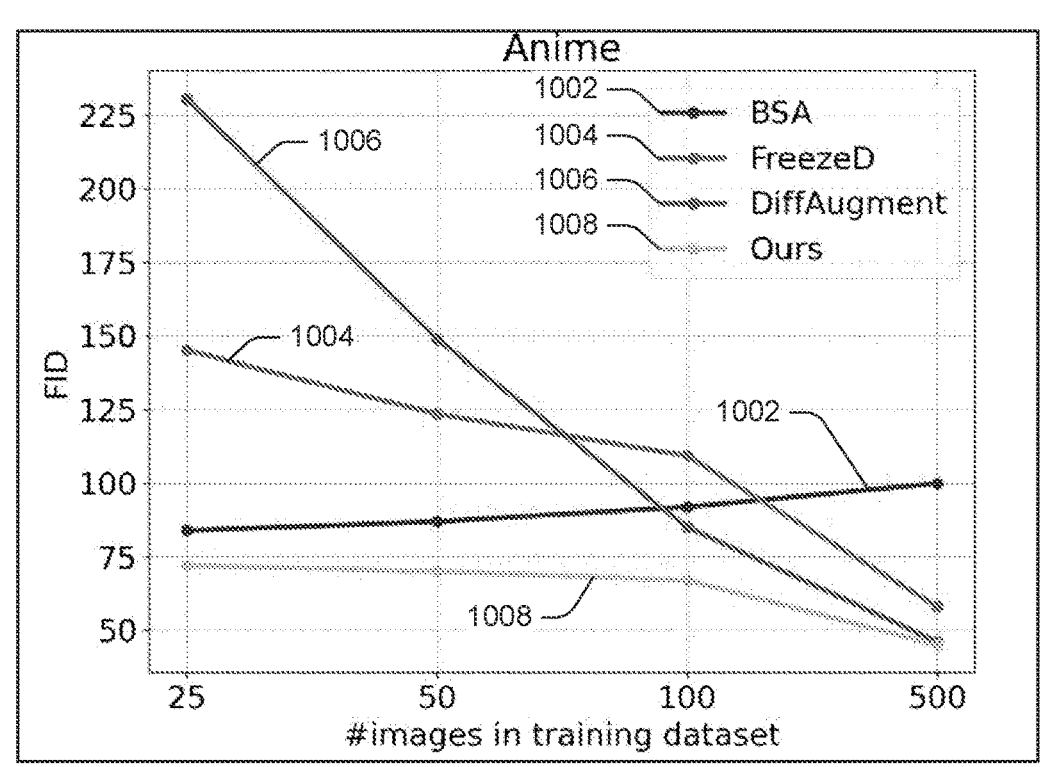
*Fig. 10*

1100

NON-ADVERSARIAL IMAGE GENERATION USING TRANSFER LEARNING

BACKGROUND

Generative adversarial networks are capable of generating digital images that appear realistic across a variety of different domains such as digital images depicting human faces, animated characters, animals, plants, and so forth. In order to generate digital images that depict objects of a particular domain, a generative adversarial network is trained on training data describing thousands of digital images (e.g., 100,000 digital images) depicting objects of the particular domain. The reason that many thousands of digital images are used for training (rather than using just a few digital images) is to avoid discriminator overfitting which occurs as a result of training the generative adversarial network on a training dataset that includes a relatively small number of digital images. This overfitting causes the generative adversarial network to learn to generate digital images that are not visually similar (or that are too visually similar) to the digital images included in the training dataset.

SUMMARY

Techniques and systems for non-adversarial image generation using transfer learning are described. In an example, a computing device implements a generation system to receive input data describing random noise. The generation system generates a latent representation in a latent space of a machine learning model based on the random noise using a transformer model that is trained to generate latent representations in the latent space.

A digital image is generated using the machine learning model based on the latent representation. The digital image depicts an object that is visually similar to objects depicted in digital images of a training dataset used to train the machine learning model based on a perceptual loss. For example, the training dataset includes a relatively small number of the digital images (e.g., less than 1,000 digital images).

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 illustrates a representation of using transfer learning to generate latent representations of digital images included in a set of digital images.

FIG. 6 is a flow diagram depicting a procedure in an example implementation in which a digital image is generated depicting an object that is visually similar to objects depicted in digital images of a training dataset.

FIG. 7 is a flow diagram depicting a procedure in an example implementation in which a digital image is generated based on random noise using a transformer model and a machine learning model.

FIG. 10 illustrates a representation of Fréchet inception distances computed for digital images generated based on training datasets that include different numbers of digital images.

DETAILED DESCRIPTION

Overview

Figure 1:
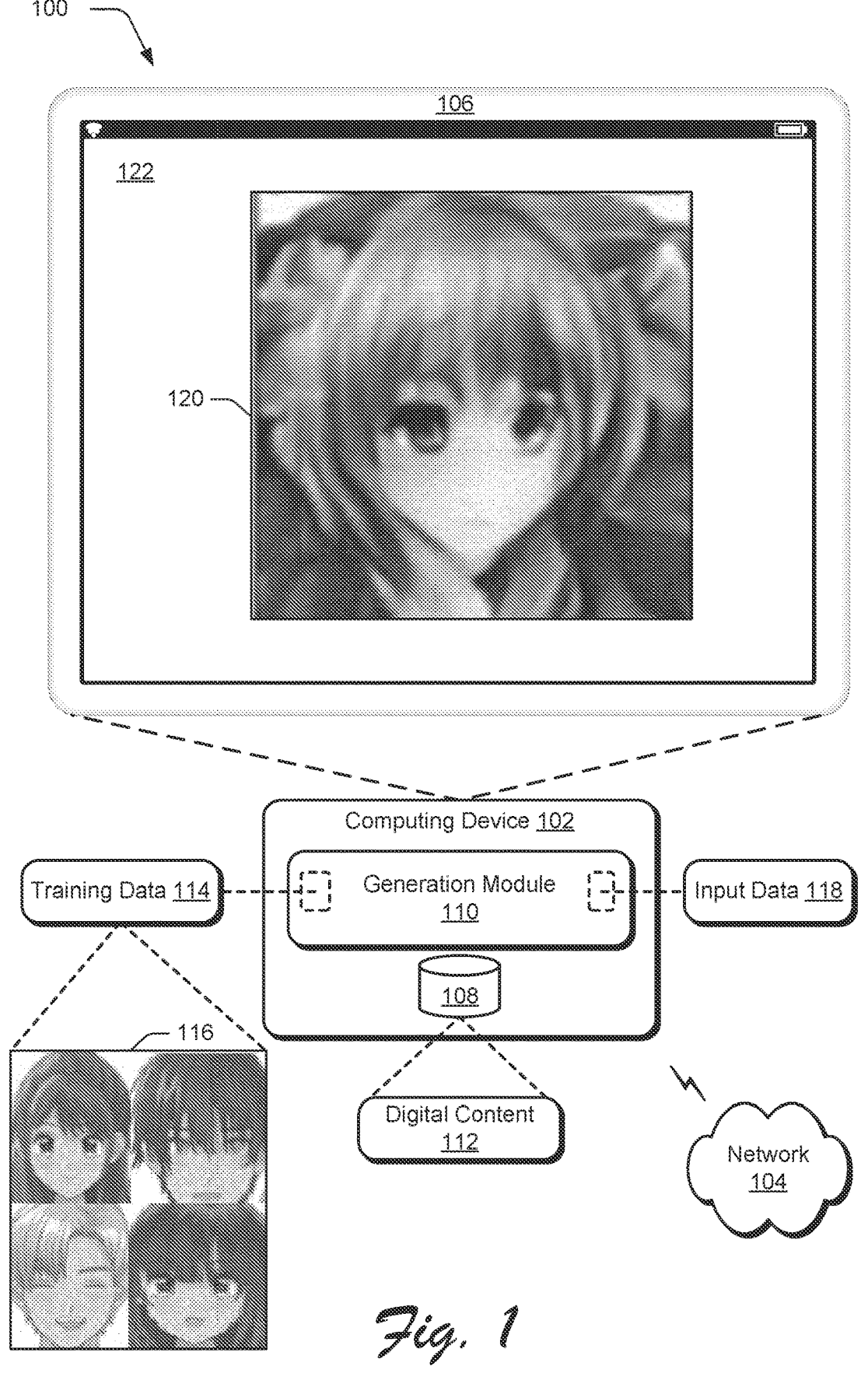
FIG. 1 is an illustration of an environment in an example implementation that is operable to employ digital systems and techniques for non-adversarial image generation using transfer learning as described herein.

A generative adversarial network is trained to generate digital images using training data describing many thousands of digital images in order to avoid discriminator overfitting which occurs as a result of training the generative adversarial network on a training dataset that includes a relatively small number of digital images. If this overfitting is not avoided, then the generative adversarial network does not learn to generate digital images that are visually similar to the digital images included in the training dataset or the generative adversarial network "memorizes" and reproduces digital images included in the training dataset. However, it is often impractical or impossible to accumulate thousands of digital images in a particular domain (e.g., a rare domain, a personalized domain, etc.) to use for training the generative adversarial network such that the trained generative adversarial network is capable of generating digital images which appear realistic in the particular domain. As a result, conventional systems that utilize generative adversarial networks are only capable of generating digital images that appear realistic within domains in which many thousands of digital images are available for training the generative adversarial networks which is a limitation of conventional systems.

In order to overcome this limitation, techniques and systems for non-adversarial image generation using transfer learning are described. In one example, a computing device implements a generation system to modify weights of a pretrained generative adversarial network based on a training dataset that includes a relatively small number of digital images (e.g., ~100 digital images). For example, the pretrained generative adversarial network is trained on thousands of digital images in domains that are different from a domain of the digital images included in the training dataset.

The generation system leverages a classification model (e.g., a convolutional neural network) that is pretrained on training data to classify objects depicted in digital images to generate latent representations of the digital images included in the training dataset and a multilayer perceptron to project the latent representations into a latent space of the pretrained generative adversarial network. In an example, the generation system implements the pretrained generative adversarial network to generate digital images based on the projected latent representations, and the generation system modifies weights of the pretrained generative adversarial network and the multilayer perceptron based on a perceptual loss between the generated digital images and corresponding digital images included in the training dataset. After minimizing the perceptual loss, the generation system uses the generative adversarial network with the modified weights to generate a latent representation $z_i^*$ of each digital image included in the training dataset.

For instance, the generation system expands the empirical latent distribution $\{z_i^*\}$ within the latent space of the generative adversarial network with the modified weights using a mix-up interpolation strategy. As part of interpolating between the latent representations $z_i^*$ of the digital images included in the training dataset, the generation system trains a transformer model (e.g., a multilayer perceptron network) to map input data describing random noise into the empirical latent distribution $\{z_i^*\}$. After training the transformer model, the generation system implements the trained transformer model to receive the input data describing the random noise, and map the random noise into a latent representation in the empirical latent distribution $\{z_i^*\}$ using Implicit Maximum Likelihood Estimation.

The generative adversarial network having the modified weights generates a digital image based on the latent representation, and the generated digital image depicts an object that is visually similar to objects depicted in the digital images included in the training dataset. Notably, the object depicted by the generated digital image is not "memorized" and reproduced based on an object depicted by a digital image in the training dataset which includes the relatively small number of digital images. This is not possible in conventional systems that are limited to generating digital images that are visually similar to thousands of digital images used to train generative adversarial networks of the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a generation module 110. The storage device 108 is illustrated to include digital content 112 such as digital images, digital artwork, digital videos, etc.

The generation module 110 is illustrated as having, receiving, and/or transmitting training data 114. For example, a user interacts with an input device (e.g., a mouse, a keyboard, a stylus, a touchscreen, etc.) to transmit the training data 114 to the generation module 110 via the network 104. As shown, the training data 114 describes a training dataset 116 of digital images. The digital images included in the training dataset 116 depict faces of animated characters, and the user transmits the training data 114 to the generation module 110 to generate a digital image depicting a face of an animated character that is visually similar to the faces of animated characters depicted by the digital images included in the training dataset 116.

In an example in which the training dataset 116 includes a large enough number of digital images (e.g., more than 10,000 images, more than 100,000 images, more than 1,000,000 images, etc.), the generation module 110 is capable of training a machine learning model on the training dataset 116 to generate digital images depicting objects that are visually similar to objects depicted by digital images included in the training dataset 116. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example in which the training dataset 116 includes a relatively small number of digital images (e.g., less than 10,000 images, less than 1,000 images, less than 100 images, and so forth), the generation module 110 is not capable of training the machine learning model on the training dataset 116 to generate digital images depicting objects that are visually similar to objects depicted by digital images included in the training dataset 116. This is because the relatively small number of training samples included in the training dataset 116 causes overfitting or mode collapse when training the machine learning model. For example, rather than learning to generate digital images that are visually similar to digital images included in the training dataset 116, the machine learning model only learns to reproduce the digital images included in the training dataset 116 and/or learns to generate digital images that are not visually similar to the digital images included in the training dataset 116.

In order to overcome this limitation, the generation module 110 leverages pretrained machine learning models to generate a digital image that is visually similar to digital images included in the training dataset 116. In an example, the generation module 110 utilizes a generative adversarial network that is pretrained on a training data describing many digital images of many different domains to generate digital images in the many different domains based on input data 118 describing random noise. In this example, the generative adversarial network projects a latent representation of the random noise into a latent space learned from training on the many digital images, and the generative adversarial network generates a digital image based on the latent representation in the latent space.

For example, the pretrained generative adversarial network is capable of generating digital images depicting animals, sunsets, beaches, photorealistic faces of people, and so forth. In order to generate a digital image in a domain of the digital images included in the training dataset 116, the generation module 110 leverages a classification model that is pretrained on training data describing many labeled digital images to classify objects depicted in digital images. For instance, the pretrained classification model is a convolutional neural network (e.g., VGG-16) which is pretrained on more than 1,000,000 digital images (e.g., ImageNet) to classify objects depicted in images.

In one example, the generation module 110 uses the pretrained generative adversarial network, the pretrained classification model, and a multilayer perceptron to generate latent representations of the digital images included in the training dataset 116. To do so, the generation module 110 generates latent representations of the digital images included in the training dataset 116 using the pretrained classification model. The generation module 110 projects the latent representations of the digital images generated using the pretrained classification model into a latent space of the pretrained generative adversarial network using the multilayer perceptron.

For example, the generation module 110 generates digital images using the pretrained generative adversarial network based on the projected latent representations and adjusts weights of the multilayer perceptron and the pretrained generative adversarial network to minimize a perceptual loss between generated digital images and the digital images included in the training dataset 116. By adjusting the weights of the multilayer perceptron and the generative adversarial network to minimize the perceptual loss, the generation module 110 identifies a latent representation of each digital image included in the training dataset 116 which is usable to reconstruct the corresponding digital image. The generation module 110 uses the set of latent representations (e.g., 100 latent representations) of the digital images included in the training dataset 116 to generate many latent representations in the domain of the digital images.

To do so in one example, the generation module 110 interpolates between two of the latent representations included in the set of latent representations using Implicit Maximum Likelihood Estimation. This expands the set of latent representations in the latent space from a small number (e.g., 100 latent representations) to a large number (e.g., an infinite set of latent representations). For example, the generation module 110 trains a transformer model (e.g., a multilayer perceptron) to map random noise described by the input data 118 to latent representations included in the expanded set of latent representations. After training the transformer model, the generation module 110 implements the trained transformer model and the generative adversarial network having the modified weights based on the perceptual loss to receive the input data 118 describing random noise. In an example, the trained transformer model generates a latent representation of the random noise in the expanded set of latent representations, and the generative adversarial network with the modified weights generates a digital image 120 based on the latent representation of the random noise.

As shown, the digital image 120 is displayed in a user interface 122 of the display device 106 and the digital image 120 depicts a face of an animated character which is visually similar to faces of animated characters depicted by the digital images included in the training dataset 116. Notably, the face of the animated character depicted by the digital image 120 is not a reproduction of a face of an animated character depicted by a digital image included in the training dataset 116. This is not possible using conventional systems for generating images because of the relatively small number of digital images included in the training dataset 116.

Figure 2:
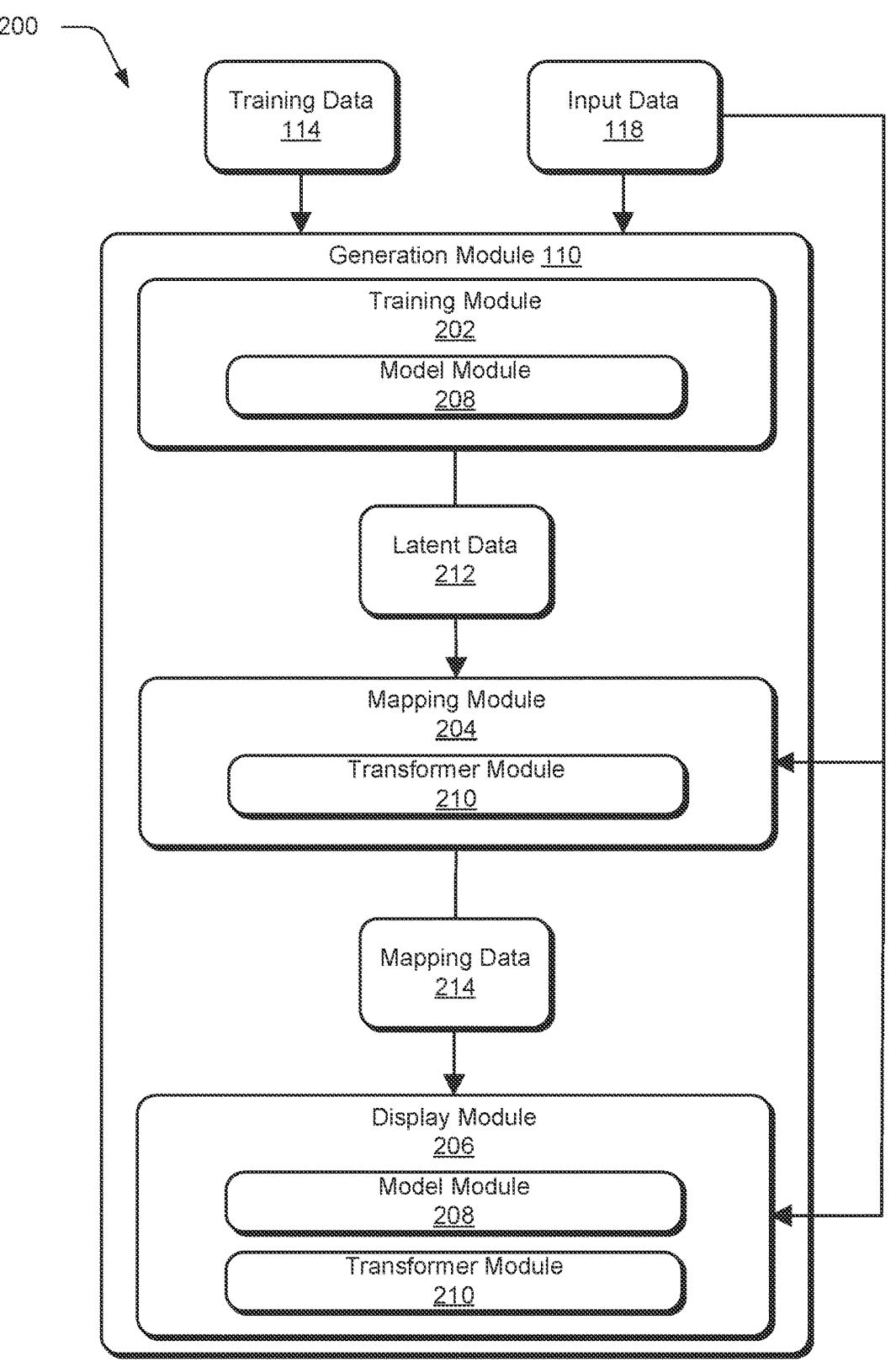
FIG. 2 depicts a system in an example implementation showing operation of a generation module for non-adversarial image generation using transfer learning.

FIG. 2 depicts a system 200 in an example implementation showing operation of a generation module 110. The generation module 110 is illustrated to include a training module 202, a mapping module 204, and a display module 206. For example, the training module 202 includes a model module 208; the mapping module 204 includes a transformer module 210; and the display module 206 includes the model module 208 and the transformer module 210.

FIG. 3 illustrates a representation 300 of using transfer learning to generate latent representations of digital images included in a set of digital images. The representation 300 includes the training dataset 116. For instance, the training module 202 receives the training data 114 describing the training dataset 116 which includes a relatively small number of digital images such as 25 images, 50 images, 100 images, 500 images, etc. In an example, the training dataset 116 does not include enough digital images for the training module 202 to train a machine learning model to generate digital images that are visually similar to the digital images in the training dataset 116.

In order to generate digital images that are visually similar to the digital images included in the training dataset 116, the training module 202 leverages the model module 208 which is illustrated in the representation 300 as a generative adversarial network that is pretrained to generate digital images based on training data describing many thousands of digital images. In one example, the model module 208 includes a pretrained generative adversarial network as described by Miyato et al., *Spectral Normalization for Generative Adversarial Networks*, arXiv: 1802.05957v1 [cs.LG], (16 Feb. 2018). In another example, the model module 208 includes a pretrained generative adversarial network as described by Karras et al., *Analyzing and Improving the Image Quality of StyleGAN*, arXiv: 1912.04958v2 [cs.CV], (23 Mar. 2020).

Even though the model module 208 includes a generative adversarial network that is pretrained on training data of different domains than a target domain of the digital images included in the training dataset 116, the pretrained generative adversarial network includes learned weights which are usable for generating digital images in the target domain. In order to leverage these learned weights, the training module 202 uses a classification model 302 which is pretrained on training data describing thousands of digital images to classify objects depicted in digital images. For example, the classification model 302 includes a convolutional neural network (e.g., a VGG-16 model) trained on the ImageNet database of millions of labeled digital images. In this example, the pretrained classification model 302 has learned patterns and prior information based on the digital images included in the ImageNet database which are also useful for generating digital images in the target domain.

As shown in FIG. 3, the training module 202 uses the model module 208 (e.g., the pretrained generative adversarial network), the pretrained classification model 302, and a multilayer perceptron model 304 to generate a latent representation of each digital image included in the training dataset 116. To do so in one example, the training module 202 implements the pretrained classification model 302 to generate latent representations of digital images included in the training dataset 116. In this example, the training module 202 projects these latent representations into a latent space of the model module 208 using the multilayer perceptron model 304. The pretrained generative adversarial network of the model module 208 generates digital images 306 based on the projected latent representations in the latent space, and the training module 202 compares the generated digital images 306 with the digital images included in the training dataset 116 to minimize a perceptual loss 308. For example, the training module 202 adjusts weights of the multilayer perceptron model 304 and adjusts weights of the pretrained generative adversarial network included in the model module 208 to minimize the perceptual loss 308.

In an example, this is representable as:

$$G^*, f^* = \arg\frac{\min}{\{G, F\}} L_{perceptual}(G(f(C(x_i))), x_i)$$

$$z_i^* = f^*(C(x_i))$$

where: $x_i$ represents a digital image included in the training dataset 116; $C(\cdot)$ represents the pretrained classification model 302; $G(\cdot)$ represents the pretrained generative adversarial network of the model module 208; $f(\cdot)$ represents the multilayer perceptron model 304; $L_{perceptual}(\cdot)$ represents the perceptual loss 308; f* represents the multilayer perceptron model 304 with the modified weights based on the perceptual loss 308; G* represents the pretrained generative adversarial network with the modified weights based on the perceptual loss 308; and $z_i^*$ is the latent representation of the digital image $x_i$.

After minimizing the perceptual loss 308, the training module 202 uses the pretrained generative adversarial network with the adjusted weights and the multilayer perceptron model 304 with the adjusted weights to generate a latent representation $z_i^*$ of each digital image $x_i$ included in the training dataset 116. The training module 202 generates latent data 212 as describing the latent representations $z_i^*$. For example, the latent data 212 describes 25 latent representations $z_i^*$, 50 latent representations $z_i^*$, 100 latent representations $z_i^*$, 500 latent representations $z_i^*$, and so forth.

Figure 4:
FIG. 4 illustrates a representation of training a transformer model to map random noise to a latent space based on interpolations between latent representations of digital images included in a set of digital images.

The mapping module 204 receives and processes the latent data 212 and the input data 118 to generate mapping data 214. FIG. 4 illustrates a representation 400 of training a transformer model to map random noise to a latent space based on interpolations between latent representations of digital images included in a set of digital images. For example, the mapping module 204 trains the transformer module 210 to learn mappings T(e) 402 that map random noise 404 described by the input data 118 to a latent space 406 based on the latent representations $z_i^*$ described by the latent data 212. In this example, the transformer module 210 includes a transformer model (e.g., a multilayer perceptron), and the mapping module 204 trains the transformer model to learn the mappings T(e) 402 by sampling trivially (e.g., multivariate normal N(0, I)) to an empirical latent representation distribution $\{z_i^*\}$ using techniques such as described by Li et al., *Implicit Maximum Likelihood Estimation*, arXiv: 1809.09087v2 [cs.LG], (22 Oct. 2018).

In one example, this is representable as:

$$\{e_1, e_2, \ldots, e_M\} \sim N(0, I)$$

$$Z = \{z_1^*, z_2^*, \ldots, z_T^*\}$$

$$Z^m = \{z_t^m \text{s.t} \lambda \cdot z_i^* + (1 - \lambda) \cdot z_j^* \text{ where } z_i^*, z_j^* \sim Z \text{ and } \lambda \sim U[0, 1]\}$$

$$e_t = \arg\frac{\min}{e_m} \|z_t^m - T(e_m)\|$$

$$T^* = \arg\frac{\min}{T} \sum_t \|z_t^m - T(e_t)\|_2^2$$

where: $\lambda$ represents a mix-up coefficient; $z_i^*$ is a first latent representation in the empirical latent representation distribution $\{z_i^*\}$; and $z_j^*$ is a second latent representation in the empirical latent representation distribution $\{z_i^*\}$.

For instance, the mapping module 204 generates the mapping data 214 as describing the mappings T(e) 402. By learning the mappings T(e) 402, the transformer module 210 is implementable along with the pretrained generative adversarial network with the adjusted weights to generate digital images which are visually similar (e.g., but not identical) to the digital images included in the training dataset 116. This is possible even though a number of the digital images included in the training dataset 116 is relatively small.

Figure 5:
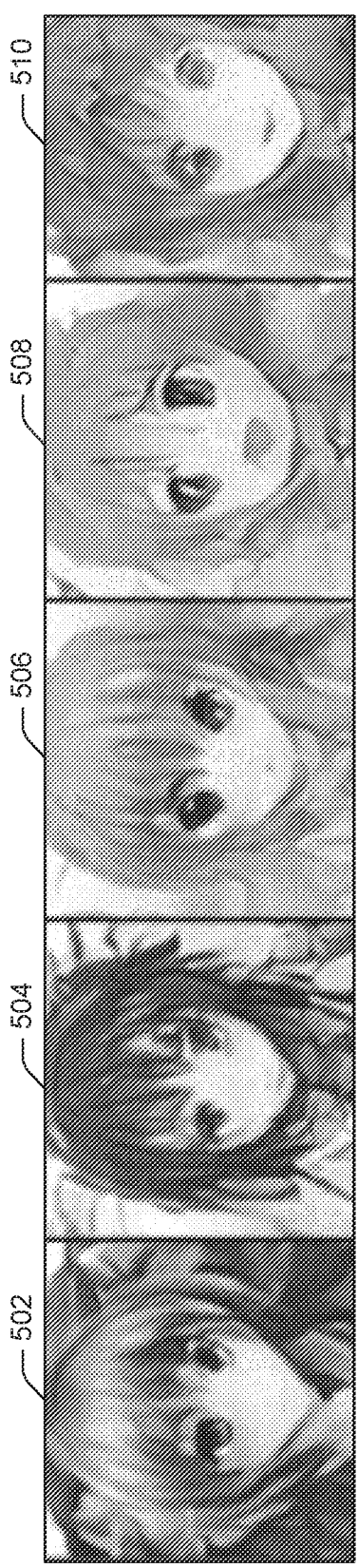
FIG. 5 illustrates a representation of digital images generated using non-adversarial transfer learning.

FIG. 5 illustrates a representation 500 of digital images generated using transfer learning. The display module 206 receives the mapping data 214 and the input data 118. For example, the display module 206 implements the transformer module 210 to generate latent representations of random noise described by the input data 118, and the transformer module 210 maps the latent representations to the empirical latent representation distribution $\{z_i^*\}$ using the mappings T(e) 402 described by the mapping data 214. In this example, the display module 206 implements the model module 208 which includes the pretrained generative adversarial network with the adjusted weights to generate digital images 502-510 based on the mapped latent representations in the empirical latent representation distribution $\{z_i^*\}$.

As shown in the representation 500, the digital images 502-510 depict faces of animated characters which are visually similar to the faces of animated characters depicted by the digital images included in the training dataset 116. Notably, the faces of the animated characters depicted in the digital images 502-510 are not reproduced ones of the faces of animated characters depicted by the digital images included in the training dataset 116. Rather, the digital images 502-510 are novel and have been generated as having a visual style of the digital images included in the training dataset 116 even though a number of the digital images included in the training dataset 116 is relatively small (e.g., substantially fewer training samples than needed to train the generative adversarial network from scratch).

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which a digital image is generated depicting an object that is visually similar to objects depicted in digital images of a training dataset.

Input data is received describing random noise (block 602). The computing device 102 implements the generation module 110 to receive the input data in some examples. A latent representation is generated in a latent space of a machine learning model based on the random noise using a transformer model that is trained to generate latent representations in the latent space (block 604). For example, the generation module 110 generates the latent representation using the transformer model. A digital image is generated using the machine learning model based on the latent representation, the digital image depicting an object that is visually similar to objects depicted in digital images of a training dataset used to train the machine learning model based on a perceptual loss (block 606). In an example, the generation module 110 generates the digital image using the machine learning model.

FIG. 7 is a flow diagram depicting a procedure 700 in an example implementation in which a digital image is generated based on random noise using a transformer model and a machine learning model. Training data is received describing a set of digital images (block 702). In some examples, the computing device 102 implements the generation module 110 to receive the training data. The machine learning model is trained using the training data based on a perceptual loss (block 702). For example, the generation module 110 trains the machine learning model on the training data.

A transformer model is trained using latent representations of digital images included in the set of digital images (block 706). In one example, the generation module 110 trains the transformer model on the latent representations. A digital image is generated depicting an object that is visually similar to objects depicted in the digital images included in the set of digital images using the transformer model and the machine learning model based on random noise (block 708). The generation module 110 generates the digital image in some examples.

Figure 8:
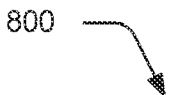
FIG. 8 illustrates a representation of digital images generated based on digital images included in a first training dataset.

FIG. 8 illustrates a representation 800 of digital images generated based on digital images included in a first training dataset. In order to evaluate the described systems for generating images using transfer learning, the model module 208 was implemented using the generative adversarial network described by Miyato et al. for generating digital images of resolution 128×128 (based on three different datasets) and also using the generative adversarial network described by Karras et al. for generating digital images of resolution 256×256 (based on three additional different datasets). Weights of the pretrained generative adversarial network of the model module 208 were modified by fine turning the pretrained generative adversarial network using a batch-size of 50 with a learning rate of 0.01 for 4000 epochs. For learning the mappings T(e) 402, the transformer module 210 was implemented using a 3-layer multilayer perceptron network with a noise dimension of 64. The 3-layer multilayer perceptron network is trained for 500 epochs with a learning rate of 0.05.

The first dataset evaluated was the training dataset 116 of digital images depicting faces of animated characters. In an example, the first dataset includes images from the dataset Anonymous, The Danbooru Community, & Gwern Branwen, "Danbooru2018." As shown in the representation, digital images 802 were generated without using the mappings T(e) 402 (e.g., generated using the pretrained generative adversarial network with the modified weights). The digital images 802 have a corresponding Fréchet inception distance (FID) of 120.30. For instance, digital images 804 were generated using a first conventional system and have a corresponding FID of 102.75; digital images 806 were generated using a second conventional system and have a corresponding FID of 92.0; digital images 808 were generated using third conventional system and have a corresponding FID of 109.40; and digital images 810 were generated using a fourth conventional system and have a corresponding FID of 85.16. Digital images 812 were generated using the described systems for generating images using transfer learning and have a corresponding FID of 67.07. Thus, the described systems demonstrate superior FID scores relative to the four conventional systems. Although a visual quality of the digital images 810 is arguably superior to a visual quality of the digital images 812, this is because the fourth conventional system suffered from overfitting and failed to generate novel images during the inference process (e.g., the digital images 810 are "memorized" and reproduced from images in the training dataset 116).

Figure 9:
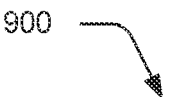
FIG. 9 illustrates a representation of digital images generated based on digital images included in a second training dataset.

FIG. 9 illustrates a representation 900 of digital images generated based on digital images included in a second training dataset. The second training dataset includes digital images depicting flowers. Digital images 902 were generated without using the mappings T(e) 402 (e.g., generated using the pretrained generative adversarial network with the modified weights) and have a corresponding FID of 124.02. Digital images 904 were generated using the first conventional system and have a corresponding FID of 113.35; digital images 906 were generated using the second conventional system and have a corresponding FID of 129.98; digital images 908 were generated using the third conventional system and have a corresponding FID of 91.80; and digital images 910 were generated using the fourth conventional system and have a corresponding FID of 83.43. Digital images 912 were generated using the described systems for generating images using transfer learning and have a corresponding FID of 78.48. Accordingly, the described systems demonstrate superior FID scores relative to the four conventional systems on multiple training datasets.

FIG. 10 illustrates a representation 1000 of Fréchet inception distances computed for digital images generated based on training datasets that include different numbers of digital images. FID scores 1002 are for digital images generated using the second conventional system; FID scores 1004 are for digital images generated using the third conventional system; FID scores 1006 are for digital images generated using the fourth conventional system; and FID scores 1008 are for digital images generated using the described systems for generating images using transfer learning. As shown in the representation 1000, the described systems demonstrate superior FID scores relative to the second, third, and fourth conventional systems even when trained on training datasets having as few as 100, 50, or 25 digital images.

Example System and Device

Figure 11:
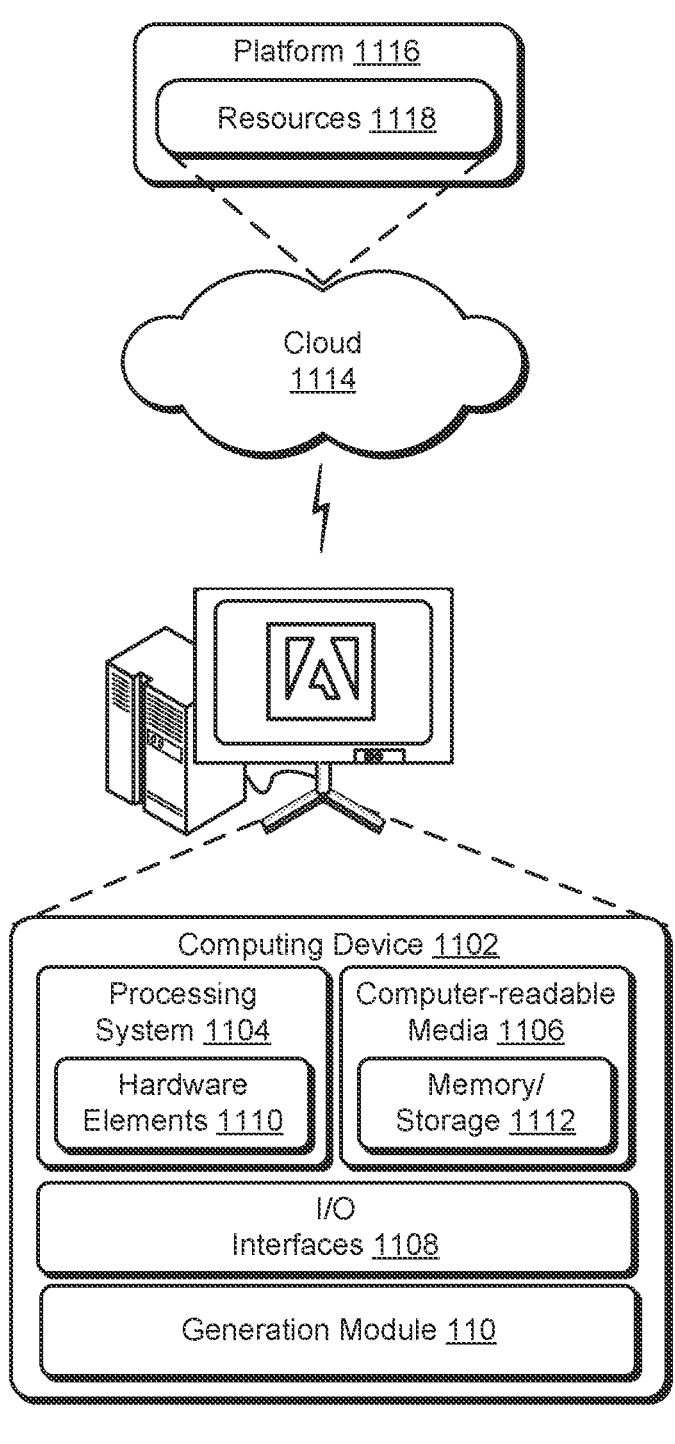
FIG. 11 illustrates an example system that includes an example computing device that is representative of one or more computing systems and/or devices for implementing the various techniques described herein.

FIG. 11 illustrates an example system 1100 that includes an example computing device that is representative of one or more computing systems and/or devices that are usable to implement the various techniques described herein. This is illustrated through inclusion of the generation module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although implementations of systems for non-adversarial image generation using transfer learning have been described in language specific to structural features and/or methods, it is to be understood that the appended claims are not necessarily limited to the specific features or methods described. Rather, the specific features and methods are disclosed as example implementations of systems for non-adversarial image generation using transfer learning, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a computing device, input data describing random noise;
generating, by the computing device, a latent representation in a latent space of a machine learning model based on the random noise using a transformer model that is trained at least in part based on interpolation of latent representations of digital images to generate latent representations in the latent space; and
generating, by the computing device, a digital image using the machine learning model based on the latent representation, the digital image depicting an object that is visually similar to objects depicted in digital images of a training dataset used to train the machine learning model based on a perceptual loss.

2. The method as described in claim 1, wherein the machine learning model is trained using an additional machine learning model.

3. The method as described in claim 2, wherein the additional machine learning model is pretrained on training data to classify objects depicted in digital images.

4. The method as described in claim 2, wherein the machine learning model is a generative adversarial network and the additional machine learning model is a convolutional neural network.

5. The method as described in claim 2, wherein the additional machine learning model is a multilayer perceptron trained on the training dataset and the perceptual loss.

6. The method as described in claim 1, wherein the transformer model is trained based on latent representations of the digital images of the training dataset.

7. The method as described in claim 6, wherein the transformer model is trained based on interpolations between the latent representations using Implicit Maximum Likelihood Estimation.

8. The method as described in claim 1, wherein the machine learning model is trained using transfer learning.

9. The method as described in claim 1, wherein the machine learning model is trained by modifying weights of a pretrained machine learning model.

10. The method as described in claim 1, wherein the machine learning model is trained using a convolutional neural network pretrained on training data to classify objects depicted in digital images and a multilayer perceptron.

11. A system comprising:
a memory component; and
a processing device coupled to the memory component, the processing device to perform operations comprising:

receiving training data describing a set of digital images;

training a machine learning model using the training data based on a perceptual loss;

training a transformer model based on latent representations of digital images included in the set of digital images to generate latent representations in a latent space of the machine learning model, the training including use of interpolations of the latent representations of the digital images; and generating a digital image depicting an object that is visually similar to objects depicted in the digital images included in the set of digital images using the transformer model and the machine learning model based on random noise.

12. The system as described in claim 11, wherein the machine learning model is trained using transfer learning.

13. The system as described in claim 11, wherein the machine learning model is trained using an additional machine learning model that is pretrained to classify objects depicted in digital images.

14. The system as described in claim 11, wherein the machine learning model includes a generative adversarial network.

15. The system as described in claim 11, wherein the transformer model is trained based on interpolations between the latent representations using Implicit Maximum Likelihood Estimation.

16. A non-transitory computer-readable storage medium storing executable instructions, which when executed by a processing device, cause the processing device to perform operations comprising:

receiving input data describing random noise;

generating a latent representation in a latent space of a machine learning model based on the random noise using a transformer model that is trained based on latent representations of digital images and interpolations of the latent representations of the digital images to generate latent representations in the latent space; and generating a digital image using the machine learning model based on the latent representation, the digital image depicting an object that is visually similar to objects depicted in digital images of a training dataset used to train the machine learning model based on a perceptual loss.

17. The non-transitory computer-readable storage medium as described in claim 16, the transformer model is trained using latent representations of the digital images of the training dataset.

18. The non-transitory computer-readable storage medium as described in claim 16, wherein the machine learning model is trained based on the perceptual loss using an additional machine learning model that is pretrained on training data to classify objects depicted in digital images.

19. The non-transitory computer-readable storage medium as described in claim 16, wherein the machine learning model includes a generative adversarial network.

20. The non-transitory computer-readable storage medium as described in claim 16, wherein the machine learning model is trained using transfer learning.

* * * * *